United States Patent [19]

Masuzawa et al.

[11] 3,869,653

[45] Mar. 4, 1975

[54] ON-OFF CONTROL DEVICE FOR DC ELECTRIC MOTOR

[75] Inventors: Isao Masuzawa, Kuki; Kazutoshi Onishi; Tsuneo Awano, both of Yokohama, all of Japan

[73] Assignee: Kabushikikaisha Tokyo Keiki (Tokyo Keiki Co., Ltd.), Tokyo, Japan

[22] Filed: July 5, 1973

[21] Appl. No.: 376,346

[30] Foreign Application Priority Data
July 10, 1972 Japan.................................. 47-68930

[52] U.S. Cl. ............................... 318/364, 318/373
[51] Int. Cl. ............................................. H02p 3/00
[58] Field of Search............................ 318/364, 373

[56] References Cited
UNITED STATES PATENTS
3,521,139   7/1970   Kendall........................... 318/373 X
3,706,021   12/1972   Yanagida......................... 318/373 X
3,777,237   12/1973   Anderson........................ 318/373 X

*Primary Examiner*—G. Z. Rubinson
*Attorney, Agent, or Firm*—Hill, Gross, Simpson, Van Santen, Steadman, Chiara & Simpson

[57] ABSTRACT

An ON-OFF control device for a DC electric motor including a switching element for driving said DC electric motor reversibly, a first relay-like operation device for the switching element, and a second relay-like operation device. The second relay-like operation device produces an output signal whose polarity is opposite to that of the output signal from said first relay-like operation device, and the output signal of said second relay-like operation device being produced when said first relay-like operation device is changed from its on-state to its off-state and related to the time interval during which said first relay-like operation device is the on-state, and the switching element being controlled with said output signal of said second relay-like operation device.

7 Claims, 8 Drawing Figures

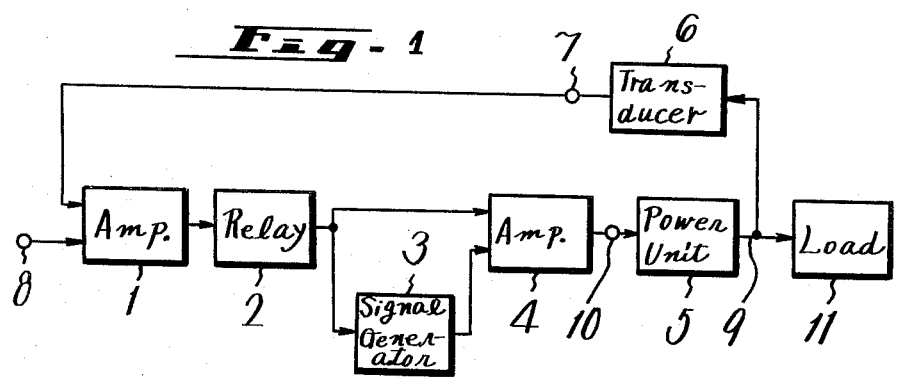
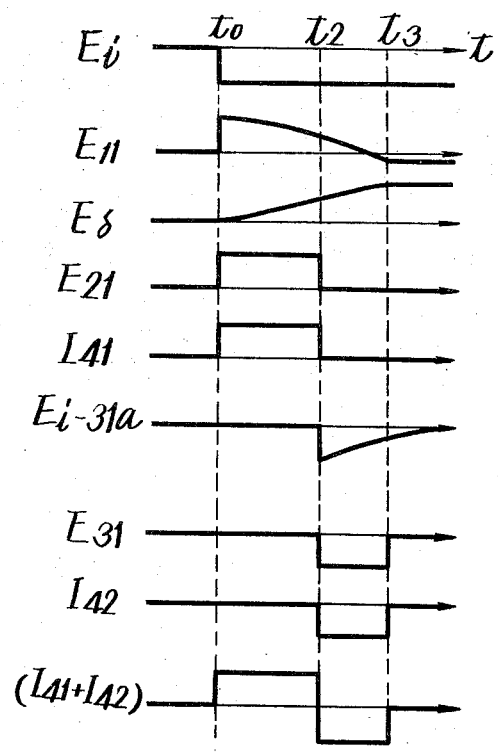

ON-OFF CONTROL DEVICE FOR DC ELECTRIC MOTOR

BACKGROUND OF THE INVENTION

1. Field of the Invention

The present invention relates generally to an ON-OFF control device for a DC electric motor.

2. Description of the Prior Art

In the prior art, a DC electric motor is controlled by a relay or relay-like operation device. In practice, the DC electric motor is started and stopped frequently. In the prior art, the stopping of the DC electric motor or braking of the DC electric motor presents some problems. By way of example, the dynamic braking method, regenerative braking method or other braking methods are less effective when the rotational speed of the DC electric motor is low and further the circuit becomes complex and expensive when a semiconductor element such as a transistor, a semiconductor controlled rectifier or the like is used as a switching element.

SUMMARY OF THE INVENTION

It is an object of the present invention to provide an ON-OFF control device for a DC electric motor in which a plug brake method is employed for positively and effectively braking operation for the DC electric motor even if it is rotated at low speed.

It is another object of the present invention to provide an ON-OFF control device for a DC electric motor which performs frequently ON-OFF control for the DC electric motor with high accuracy.

It is a further object of the present invention to provide an ON-OFF control device for a DC electric motor which is small and has a low cost.

BRIEF DESCRIPTION OF THE DRAWINGS

FIG. 1 is a block diagram for showing an example of an ON-OFF control device for a DC electric motor according to the invention;

FIG. 5 is a diagram used for explaining the operation of the device depicted in FIG. 4.

DESCRIPTION OF THE PREFERRED EMBODIMENTS

Figure 2:
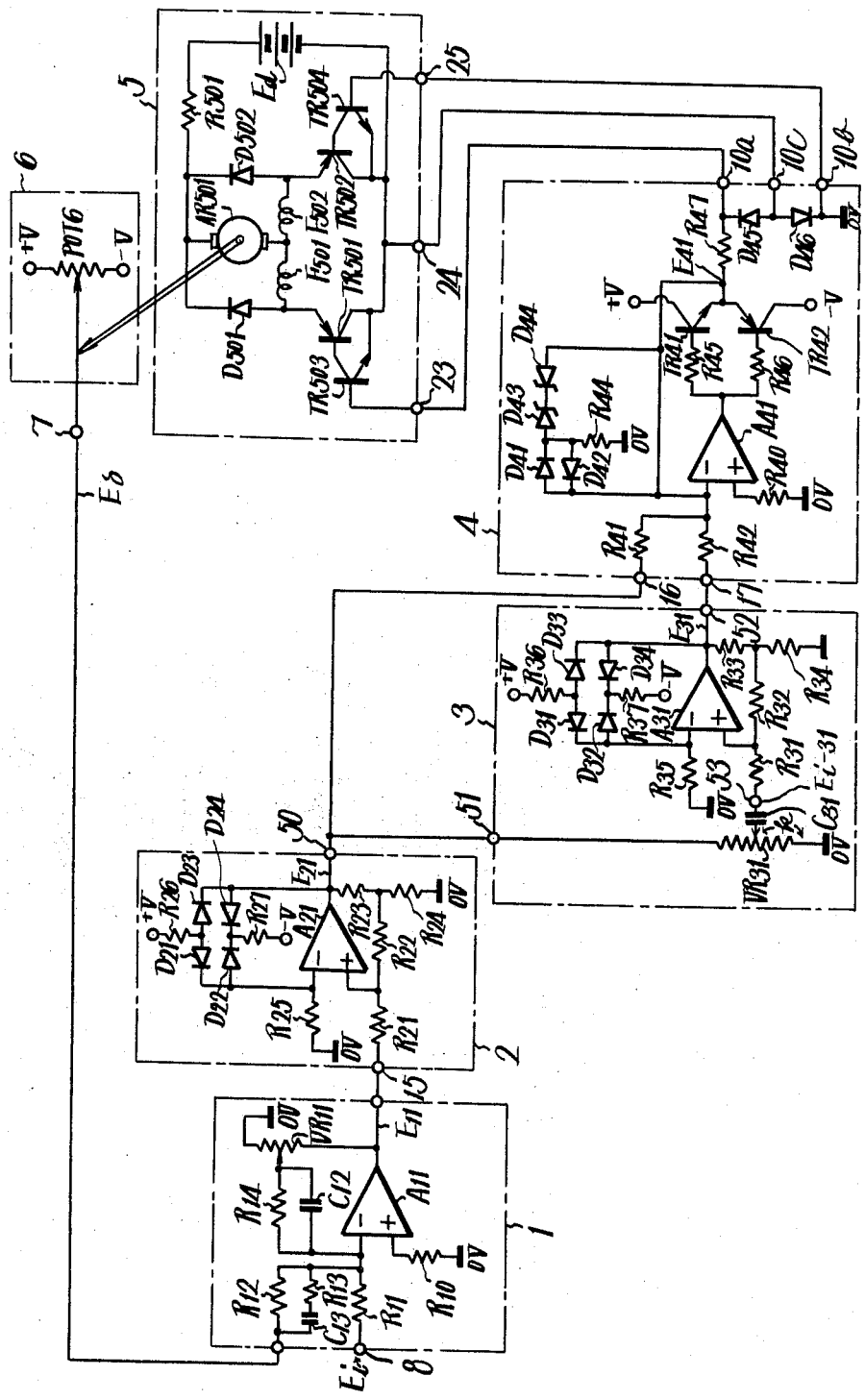
FIG. 2 is a circuit diagram for showing an embodiment of the ON-OFF control device of the invention.

With reference to FIG. 1, a description will be now given of the theory for an ON-OFF control device for a DC electric motor according to the invention. In FIG. 1, an amplifier 1 has an input terminal 8. When an input signal is applied to the input terminal 8, the input signal is amplified by the amplifier 1 and the output of the amplifier 1 is applied to a relay-like operation device 2 to turn it on. The output from the relay-like operation device 2 is fed through an adding amplifier 4 to a power unit 5 which consists of a DC electric motor and a control circuit for reversibly controlling the DC electric motor. The control circuit is driven with the signal from output terminal 10 of the adding amplifier 4 and the DC electric motor is driven in the forward direction or reverse direction. A load 11 is coupled to the output shaft of the DC motor. A rotation angle signal 9, indicative of the output shaft position of the electric motor, is converted to a corresponding voltage signal by a transducer 6 and its output is fed back through a terminal 7 to the input of amplifier 1. When the input signal to the input terminal 8 is equal to the fed-back signal from the feedback terminal 7 the relay 2 will be in the off-state and a braking signal generator 3, which receives the output of the relay-like operation device 2, generates an output signal whose polarity is opposite to that of the output from the relay-like operation device 2. The output of the braking signal generator 3 is fed through the adding amplifier 4 to the power unit 5. Thus, the control circuit therein operates to rotate the DC electric motor in the opposite direction and hence to apply braking force to the DC electric motor which may continue to rotate due to inertia. Thus, the rotating speed thereof is reduced rapidly. The output generated from the braking signal generator 3, when the relay-like operation device 2 is in the off-state, disappears after a proper time has lapsed. Accordingly, if the generator 3 is adjusted to produce no braking signal when the rotational speed of the DC electric motor is zero or nearly zero, proper braking force will be applied to the DC electric motor.

The feature of the present invention resides in the provision of the braking signal generator 3 which generates an output signal having the opposite polarity for a proper time duration after the relay-like operation device 2 is in the off-state and the adding amplifier 4 adds and amplifies the outputs from the relay-like operation device 2 and the braking signal generator 4.

FIG. 2 shows a practical embodiment of the present invention in which reference numerals similar to those of FIG. 1 indicate the similar elements. In the embodiment of FIG. 2, the amplifier 1 includes an operational amplifier A11 to the negative input terminal of which the connection point between resistors R11 and R12 is connected to apply the input signal $E_i$ which is fed to the input terminal 8. The feedback signal $E_\delta$ from the feedback terminal 7 is fed to the negative input terminal of the operational amplifier A11 through the resistors R11 and R12, respectively. A series connection of a capacitor C13 and a resistor R13 for stabilizing the servo loop is connected in parallel to the feedback resistor R12. An output voltage signal $E_{11}$ from the operational amplifier A11 is divided by a variable resistor VR11 for adjusting the gain of the amplifier 1 and is then fed back to its negative input terminal through a resistor R14. A capacitor C12 for filtering noise is connected in parallel to the resistor R14. The positive input terminal of the operational amplifier A11 is grounded through a resistor R10. Thus, the amplifier 1 is fundamentally an adding amplifier for the two input signals $E_i$ and $E_\delta$. The output voltage signal $E_{11}$ of the amplifier 1 is applied to an input terminal 15 of the relay-like operation device 2 which includes an operational amplifier A21, a diode bridge consisting of diodes D21, D22, D23 and D24 connected as shown in FIG. 2 and inserted between the output terminal and the negative input terminal of the operational amplifier A21. A resistor R26 is connected between a positive voltage source +V and the connection point of the anode of the diode D21 with that of the diode D23, a resistor R27 is connected between a negative voltage source −V and the connection point between the cathode of the diode D22 with that of the diode D24, and a resistor R25 is connected between an earth potential 0V and the negative input terminal of the operational amplifier A21. Series connected resistors R23 and R24 are connected between the earth potential 0V and the output terminal of the operational amplifier A21, and series connected resistors R21 and R22 are connected between the input terminal 15 and the connection point between the resistors R23 and R24. The connection point between the resistors R21 and R22 is connected to the positive input terminal of the operational amplifier A21. The voltage of an output voltage $E_{21}$ divided by the resistors R23 and R24 is fed back to the positive input terminal of the operational amplifier A21 through the resistor R22, so that the relay-like operation device 2 is made to have a hysteresis characteristic and hence to keep its output stable. If the constant of the positive feedback circuit is selected properly, the hysteresis characteristic is proper.

Figure 3A:
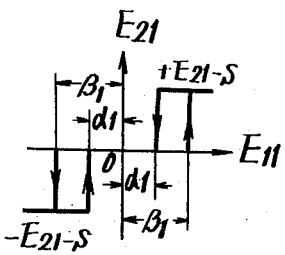
FIGS. 3A to 3C, inclusive, are diagrams used for explaining the operation of the device shown in FIG. 2.

FIG. 3A shows the characteristic of the relay-like operation device 2 when the hysteresis characteristic is selected properly as mentioned above. The input voltages for making the relay-like operation device 2 in the on and off-states ($E_i = \beta_1$ and $E_i = \alpha_1$) are given by the following equations (1) and (2), if the resistance values of the resistors R26 and R27 are equal.

$$\beta_1 = \left(1 + \frac{R21}{R22 + R23 // R24}\right) \frac{R25}{R25 + R26}(V - V_d)$$
$$- \frac{R21}{R22 + R23 // R24} \cdot \frac{R24}{R23 + R24} \cdot \frac{R25\,V + R26\,V_d}{R25 + R26} \quad (1)$$

$$\alpha_1 = \left(1 + \frac{R21}{R22 + R23 // R24}\right) \frac{R25}{R25 + R26}(V - V_d)$$
$$- \frac{R21}{R22 + R23 // R24} \cdot \frac{R24}{R23 + R24} E_{21-s} \quad (2)$$

where $V_d$ represents a voltage drop of the diode in a forward direction, $E_{21-s}$ the saturation output amplitude of the operational amplifier A21, the references the same as the respective resistors indicates their resistance values and the mark a parallel resistance value.

The output voltage $E_{21}$ of the relay-like operation device 2 is applied through its output terminal 50 to input terminal 16 and 51 of the adding amplifier 4 and to the braking signal generator 3, respectively.

In the braking signal generator 3 which forms the main part of the present invention, the input signal $E_{21}$ is applied to its input terminal 51 and is divided by a variable resistor $VR_31$ and then fed through a capacitor C31 to a terminal 53. Between the terminal 53 and an output terminal 52 of the braking signal generator 3, there is inserted a relay-like operation circuit including an operational amplifier $A_31$, resistors R31 to R37 and diodes D31 to D34 which are connected in a similar manner to that of the operational amplifier A21, the resistors R21 to R27 and the diodes D21 to D24 of the relay-like operation device 2.

Figure 3B:
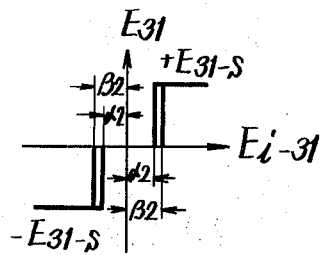

FIG. 3B shows the relationship between a voltage $E_{i-31}$ applied to the terminal 53 and an output voltage $E_{31}$ delivered to the output terminal 52. As apparent from FIG. 3B, on- and off-points $\beta_2$ and $\alpha_2$ of the relay-like operation circuit can be given by equations 62 similar to (1) and (2) for the relay-like operation device 2.

Figure 3C:
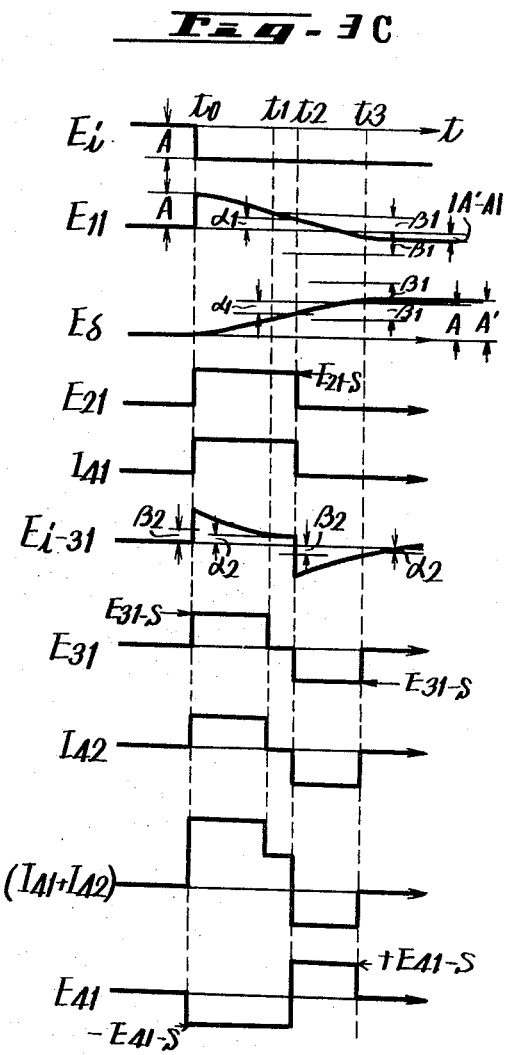

The operation of the braking signal generator 3 will be now given with reference to FIG. 3C. As shown in FIG. 3C, when the relay-like operation device 2 is changed from its off-state to on-state, the output $E_{21}$ thereof jumps from zero volts to $+E_{21-s}$. Then, the voltage $E_{21-s}$ is divided by the variable resistor $VR_31$ of the braking signal generator 3 and hence at the terminal 53 there is produced the voltage $E_{i-31}$ through the capacitor C31. The voltage $E_{i-31}$ is produced due to the charging current of the capacitor C31, which is shown in FIG. 3C. When the voltage $E_{31-s}$ is higher than that at the on-point $\beta_2$ shown in FIG. 3B, the output $E_{31}$ of the braking signal generator 3 becomes the saturation output amplitude $+E_{31-s}$, while when the voltage $E_{31-s}$ becomes lower than that at the off-point $\alpha_2$, the output of the braking signal generator 3 disappears immediately. Similarly, when the relay-like operation device 2 is changed from its on-state to off-state to change its output $E_{21}$ from $+E_{21-s}$ to zero volts, the voltage $E_{i-31}$ is applied to the terminal 53 with the discharging current of the capacitor C31. When the voltage $E_{i-31}$ is lower than that at the on-state $-\beta_2$, the output $E_{31}$ of the braking signal generator 3 becomes $-E_{31-s}$ as shown in FIG. 3C, while where the voltage $E_{i-31}$ is higher than that at the off-state $-\alpha_2$, the output $E_{31}$ disappears. The output $E_{31} = -E_{31-s}$ of the braking signal generator 3 generated at the time when the relay-like operation device 2 changes from its on-state to off-state is opposite in polarity with respect to the output $E_{21} = +E_{21-s}$ of the relay-like operation device 2 when it is in on-state, so that the output $E_{31} = -E_{31-s}$ is as a braking signal to apply a braking force to the DC electric motor.

The above description is given for the case where the relay-like operation device 2 produces the positive output voltage $E_{21} = +E_{21-s}$. It may be, however, apparent that the braking signal generator 3 operates similarly in the case where the relay-like operation device 2 produces the negative output voltage $E_{21} = -E_{21-s}$.

The main characteristic of the braking signal generator 3 will be now described in detail. A time interval $T_p$ within which the braking signal generator 3 produces the braking signal has a relationship to a time interval $T_r$ within which the relay-like operation device 2 is in the on-state, because the electric motor of the power unit 5 is controlled by the relay-like operation device 2 the electric motor is subjected to driving and stopping operations very frequently and hence it is required to apply proper braking forces to the electric motor with the load 11 in accordance with the starting characteristic of the electric motor and hence to stop its rotation. If the time interal $T_r$ within which the relay-like operation device 2 is in the on-state is short, the rotational speed of the electric motor is low, but if the time interval $T_r$ is long, the rotational speed of the electric motor is high. When the time interval $T_r$ increases further, the rotational speed reaches its maximum rotational speed. The higher the rotational speed of the electric motor, the longer the time interval $T_p$ of the braking signal stop the rotation of the electric motor. Accordingly, when the time interval $T_r$ becomes long, it is required to make the time interval $T_p$ longer also. Further, when the time interval $T_r$ becomes longer than the time interval required for rotating the electric motor at the maximum rotational speed, the time interval $T_p$ should be limited suitably. In order to produce the braking signal with such a characteristic, the braking signal generator 3 is composed of a circuit including a capacitor for differentiating the output of the relay-like operation device 2 and a relay-like operation circuit for producing a rectangular waveform pulse. The time interval $T_p$, within which the braking generator 3 produces the braking signal, relative to the time interval $T_r$, within which the relay-like operation device 2 is in on-state, can be expressed by the following equation (3), if the hysteresis of the relay-like operation circuit consisting the operational amplifier A31 is neglected for the sake of simplicity or the resistance value of the resistor R34 is deemed zero and the resistors R36 and R37 are selected to have equal resistance values:

$$T_p = T_{cd} \ln \frac{mkE_{21\text{-}S}\left\{1-\exp\left(-\frac{T_r}{T_{cd}}\right)\right\}}{n(V-V_d)} \qquad (3)$$

where $T_{cd} = (R31 + R32) C31 \ldots$ (Time constant of charging and discharging)

$m = R32/(R31 + R32)$ $n = R35/(R35 + R36)$ $k = 0$ to $1$ ... (set value of variable resistor VR31)

Further, in order to produce the braking signal or in order to limit the time interval $T_p$, the following condition (4) should be satisfied:

$mkE_{21\text{-}S} \{1 - \exp(-[T_r/T_{cd}])\} > n(V - V_d)$ (4)

The condition (4) gives the lowest time interval $T_r$ required for producing the braking signal and a practical range for the adjusted value $k$.

As apparent from the equation (3), the time interval $T_p$ within which the braking signal generator 3 produces the braking signal can be changed by varying the sliding point $k$ of the variable resistor VR31 and hence a proper braking signal is generated by suitably setting the value of $k$. The charging and discharging time constant $T_{cd}$ of the capacitor C31 and the on- and off- points determined by the resistor R35 or the resistors R36 and R37 in the relay-like operation circuit consisting of the operational amplifier A31 of the braking signal generator 3 have an effect on the time interval $T_p$. Accordingly, if these values are set to suitable ones, the braking signal with the suitable time interval $T_p$ for the dynamic characteristic of the electric motor in the power unit 5 and the load 11 thereof can be produced.

In the braking signal generator 3 shown in FIg. 2, the time interval $T_p$ is adjusted by the variable resistor VR31 for dividing the input voltage signal from the relay-like operation device 2, but it may be possible, if desired, that the parts for determining the charging and discharging time constants of the capacitor 31, for example, the capacitor 31 and/or the resistors R31 and R32 can be made variable, or the parts for determining the operation point of the relay-like operation circuit, for example, the resistor R35 and/or the resistors R36 and R37 can be made variable.

Meantime, the adding amplifier 4 includes an operational amplifier A41; a resistor R41 connected between an input terminal 16 and the negative input terminal of the operational amplifier A41; a resistor R42 connected between an input terminal 17 and the negative input terminal of the operational amplifier A41. The resistor R41 serves for applying the input signal $E_{21}$ from the relay-like operation device 2 therethrough to the negative input terminal of the operational amplifier A41 and the resistor R42 serving for applying the input signal $E_{31}$ from the braking signal generator 3 therethrough to the negative input terminal of the operational amplifier A41. Transistors TR41 and TR42 are connected to amplify the output current of the operational amplifier A41 and the base electrodes are connected to the output terminal of the operational amplifier A41 through resistors R45 and R46, respectively. The collector electrode of the transistor TR41 is connected to a positive voltage source +V and the collector electrode of the transistor TR42 is connected to a negative voltage source −V. A feedback resistor R43 is connected between the connection point of the emitter electrode of the transistor TR41 and transistor TR42 and the negative input terminal of the operational amplifier A41. A circuit for limiting the outoput voltages $E_{41}$ or the emitter voltage of the transistors TR41 and TR42 is composed of Zener diodes D43, D44, diodes D41, D42 and a resistor R44 and is connected in parallel to the resistor R43. A series connection of a resistor R47 and diodes D45, D46 is connected between the connection point of the emitter electrodes of the transistor TR41 and the transistor TR42 and an earth potential OV. In this case, output terminals 10a, 10b and 10c of the adding amplifier 4 are led out from the connection points between the resistor R47 and the cathode of the diode D45, between the cathode of the diode D46 and the earth potential OV, and between the anodes of the diodes D45 and D46, respectively.

Next, the operation of the adding amplifier 4 will be described. When input signals $E_{21}$ and $E_{31}$ are applied to two input terminals 16 and 17 of the amplifier 4 from the relay-like operation device 2 and the braking signal generator 3, respectively, as shown in FIG. 3C, input currents $I_{41}$ and $I_{42}$ flow input resistors R41 and R42 and total sum current $(I_{41} + I_{42})$ are such as depicted in FIG. 3C. The total sum of the input current $(I_{41} + I_{42})$ is equal to $(+E_{21\text{-}S)/R41} + (+E_{31\text{-}S})/R42$ while the relay-like operation device 2 is in the on state and the output voltage $E_{31}$ from the braking signal generator 3 is the same in polarity as the output $E_{21}$ from the relay-like operation device 2, that is, while $t = t_0$ to $t_1$. If the resistance values of the resistors R41 and R42 are equal to each other and if the amplitudes of saturated outputs from the relay-like operation device 2 and the braking signal generator 3 are equal to each other ($E_{21\text{-}S} = E_{31\text{-}S}$), the total sum of the input currents becomes $(I_{41} + I_{42}) = 2(+E_{21\text{-}S}/R41)$. While, where the input currents which provides the output amplitude $E_{41} = \pm E_{41\text{-}S}$ due to the output voltage limiting circuit is selected to be $(+E_{21\text{-}S}/R41)$, when the total sum of the input currents $(I_{41} + I_{42}) = 2(+E_{21\text{-}S}/R41)$, the output voltage limiting circuit operates and the amplitude of the output $E_{41}$ becomes $E_{41} = -E_{41\text{-}S}$. When the output $E_{31}$ from the braking signal generator 3 is of the same polarity as $E_{21}$ from the relay-like operation device 2, the output $E_{31}$ is made ineffective. In the period of time $t = t_1$ to $t_2$ during which the output $E_{31}$ from the braking signal generator 3 is extinguished and the output $E_{21}$ from the relay-like operation device 2 is present, $E_{41} = -E_{41\text{-}S}$ as will be seen from the foregoing description. In the period of time $t = t_2$ to $t_3$ during which the relay-like operation device 2 is in the off state and the output $E_{31}$ from the braking signal generator 3 is such that $E_{31} = -E_{31\text{-}S}$, the total sum of the input currents becomes $(I_{41} + I_{42}) = (-E_{31\text{-}S}/R42)$ and the output voltage $E_{41}$ becomes $E_{41} = +E_{41\text{-}S}$. The output voltage $E_{41}$ represents a voltage signal corresponding to the on state of the relay-like operation device 2 and a voltage signal corresponding to the state of the output from the braking signal generator 3 which is produced when the relay-like operation device 2 is in the off state. The former is for driving motor in the power unit 5 and the latter for braking it and they are opposite in polarity to each other. The output voltage $E_{41}$, dependent upon its polarity, causes diodes D46 and D45 to conduct an output current between output terminals 10a and 10c or between 10b and 10c, turning on one of the switching elements of the power unit 5 for reversible driving the motor.

The power unit 5 comprises an armature AR501 of a DC motor, series-wound field windings F501 and F502, motor drive control transistors TR501, TR502 and TR503, TR504 free wheel diodes D501 and D502 and a starting resistor R501 which are connected as illustrated. The transducer 6 is a potentiometer POT6 connected to positive and negative voltage sources +V and −V and its output voltage $E_\delta$ is proportional to the rotational angle of the output shaft of the motor.

Referring now to FIG. 3a and FIG. 3b, a description will be given of one example of the ON-OFF control device of this invention such as described above with regard to FIG. 2. Since the operation wave-forms shown in FIG. 3C have been described, the operation will be briefly described. Let it be assumed that an input voltage $E_i$ is applied to the input terminal 8 in a step-like form of $E_i = -A$ as shown. For the sake of brevity, assume that the gain of the amplifier 1 is 1 and that the resistance values of the resistors R11 and R12 are equal to each other. In the figure, the effect of the stabilizing capcitor C13 and the resistor R13 in the amplifier 1 is neglected. The output $E_{11}$ from the amplifier 1 becomes $E_{11} = +A$ as depicted and this voltage value exceeds the on-point $\beta_1$ of the relay-like operation device 2, so that the relay-like operation device 2 is turned to the on-state and its output becomes $E_{21} = +E_{21-S}$. At the same time, the braking signal generator 3 provides an output $E_{31} = +E_{31-S}$ but, while the relay-like operation device 2 remains in the on state, the output $E_{41}$ from the adding amplifier 4 is $E_{41} = -E_{41-S}$ irrespective of the output voltage $E_{31}$ from the braking signal generator 3. For this period of time, the transistors TR502 and TR504 of the power unit 5 are conductive to rotate the motor and an output signal from the transducer 6, that is, the feedback signal $E_\delta$ of the ON-OFF servo apparatus is fed back to the amplifier 1 in proportional to the rotational angle of the motor.

When the output $E_{11}$ from the amplifier 1 has become smaller than off-point $\alpha_1$ of the relay-like operation device 2 with an increase in the feedback signal $E_\delta$, the relay-like operation device 2 is to the off-state and its output $E_{21}$ goes to zero. At this time, the braking signal generator 3 produces an output $-E_{31-S}$ which is opposite in polarity to that derived from the relay-like operation device 2 before it is turned off. Consequently, the output $E_{41}$ from the adding amplifier 4 becomes $E_{41} = +E_{41-S}$ which is opposite in polarity to that when the relay-like operation device 2 is in the on state. Then, the transistors TR501 and TR503 become conductive to drive the motor in a reverse direction which tends to continue rotation due to inertia. Thus, the rotating speed of the motor is rapidly decreased. Since the motor is supplied with a proper braking signal by the braking signal generator 3 properly designed and adjusted in relation to the characteristic of the motor and its load, the output from the braking signal generator 3 becomes extinguished and the motor stops. Where the input signal $E_i$ is large, the time $T_r$ during which the relay-like operation device 2 remains in the on state is long, so that the rotating speed of the motor increases but since the capacitor C31 of the braking signal generator 3 is sufficiently charged, the time $T_p$ of the braking signal generated by the braking signal generator 3 after the relay-like operation device 2 has been turned off increases to properly brake the motor at the increased rotating speed.

The foregoing description has been given in connection with the case where the input voltage $E_i$ is negative but where the input voltage $E_i$ is positive, the polarities of the waveforms at the respective parts are opposite to those in the foregoing description and the transistors TR501 and TR503 conduct to reverse the motor and, at the time of braking, the transistors TR502 and TR504 conduct to stop the rotation of the motor.

Where the rotational angle of the motor when it stopped, that is, the magnitude A' of the feedback signal $E_\delta$ exceeds A of the input signal $E_i$ and $(A'-A) > \beta_1$, the relay-like operation device 2 is turned the on-state in the opposite polarity and if this repeats, hunting is caused. In order to prevent such an unstable phenomenon, the capacitor C13 and the resistor R13 are connected in parallel with the input resistor R12 in the amplifier 1 to which is applied the feedback signal.

The DC motor on-off control servo apparatus of this invention, shown in FIG. 2, has the following features. When the relay-like operation device 2 has been turned to the off-state, the braking signal generator 3 generates an output signal which is opposite in polarity to the output signal derived from the relay-like operation device 2 before being turned to the off-state and this output signal is used as a braking signal and the time $T_p$ during which this braking signal is generated is associated with $T_r$ during which the relay-like operation device 2 is in the on state, in other words, the rotating speed of the motor, from which the motor is properly braked with respect to various input signals $E_i$. Further, the braking signal generator 3 is an extremely simple circuit and can be produced at low cost and in small size. Moreover, as compared with the case of adopting dynamic braking systems or other braking systems, sufficient braking is possible even when the motor rotates at a low speed, so that high accuracy can be obtained.

The power unit 5 is shown as a DC series-wound motor but it will be evident that the power unit, can be a DC shunt motor or the DC compound motor and a control circuits for forward and backward rotation, can similarly be controlled.

Further, the relay-like operation device 2 may be variously modified. It is also possible to employ a circuit of other construction so long as it has a similar characteristic. The same is true of the relay-like operation device used in the braking signal generator 3. The adding amplifier 4 may be a circuit such, for example, as shows in FIG. 4, which will hereinbelow be described.

Figure 4:
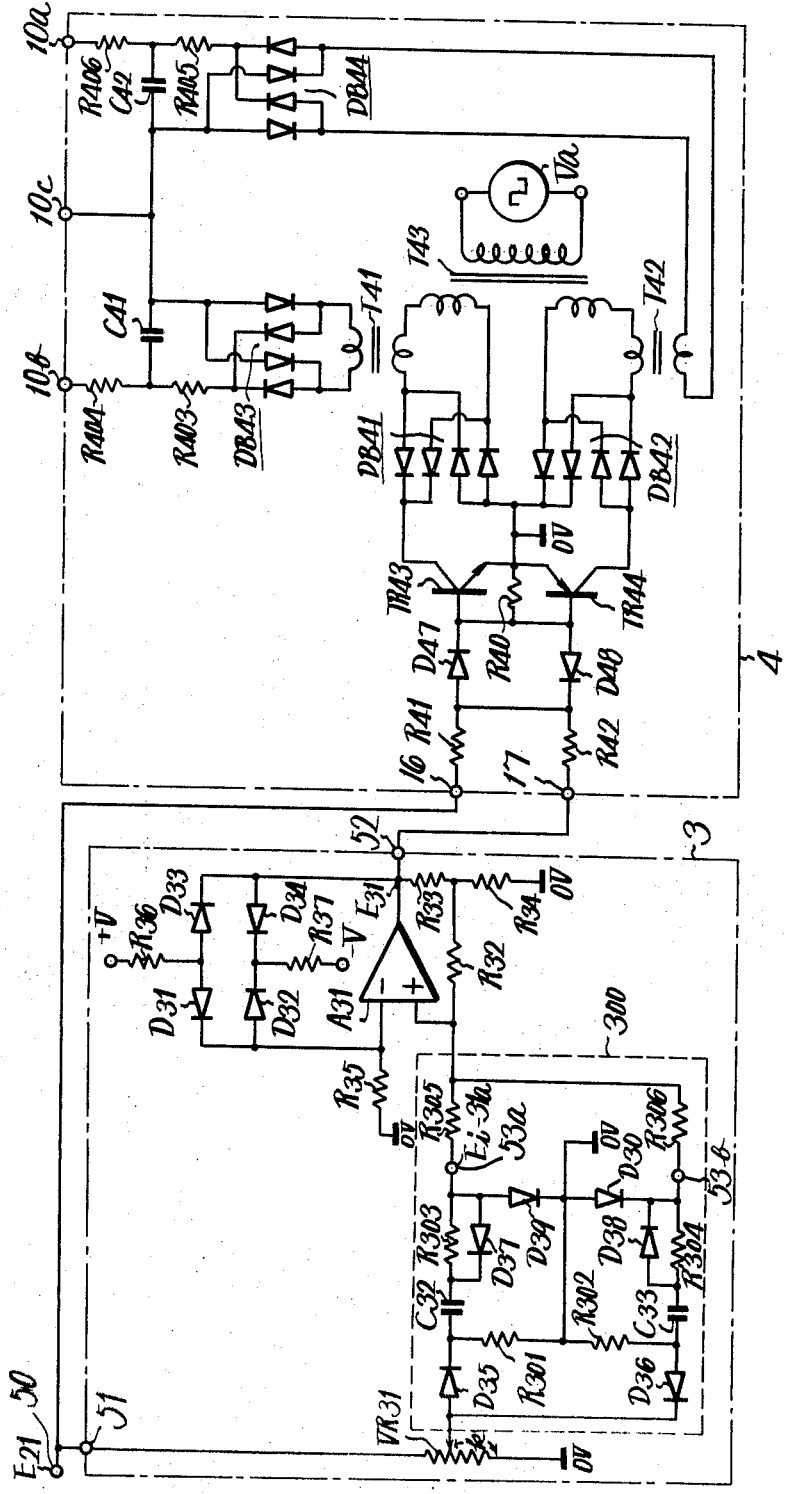
FIG. 4 is a circuit diagram for showing another embodiment of the invention.

FIG. 4 illustrates another modified form of the ON-OFF control servo apparatus of this invention. In the figure, only those parts corresponding to the blocks 3 and 4 in the block diagram of FIG. 1, that is, those parts in which this invention is featured, are depicted and since the remaining parts are the same as those in FIG. 2, they are not illustrated. In the present example, the braking signal generator 3 is identical in construction with that shown in FIG. 2 except that a circuit 300 is inserted between the sliding terminal of the variable resistor VR31 and the input terminal of the operational amplifier A31. The circuit 300 comprises diodes D35 to D39 and D30, resistors R301 and R306 and capacitors C32 and C33, which are connected as illustrated. The operation of this braking signal generator 3 will be described. Since the circuit 300 is symmetrical with respect to positive and negative inputs, a description will be given with regard to the case of the positive input signal $+E_{21-S}$. Upon application of the output voltage $E_{21}$ of the relay-like operation device 2 to the input terminal 51 as shown in FIg. 5, a charging current flows to the capacitor C32 through the variable resistor VR31, the diode D35, the capacitor C32, the resistor R303 and the diode D39. At this time, the input voltage $E_{i-31a}$ to the relay-like operation circuit formed with the operational amplifier A31 is limited to a forward voltage drop by the diode D39, so that the relay-like operation circuit composed of the operational amplifier A31 remains in the off state. When the relay-like operation device 2 has been turned to the off-state, the charge stored in the capacitor C32 flows in a closed circuit consisting of the capacitor C32, the resistor R301, ground, the resistors R34, R32 and R305 and the diode D37 and a closed circuit consisting of the capcitor C32 the resistor R301, ground, the diode D30, the resistors R306 and R305 and the diode D37 and the voltage at the terminal 53a, that is, the input voltage $E_{i-31a}$ to the relay-like operation circuit, is negative and exhibits a discharge curve as shown in FIG. 5. With the voltage $E_{i-31a}$, the relay-like operation circuit formed with the operational amplifier A31 is turned to the on-state and the output $E_{31}$ from the braking signal generator 3 becomes $E_{31} = -E_{31-S}$. As the input voltage $E_{i-31a}$ decrease, the relay-like operation circuit is turned to the off-state and the output $E_{31}$ from the braking signal generator 3 becomes extinguished. The waveforms of this operation are shown in FIg. 5. As compared with the braking signal generator 3 depicted in FIG. 2, the generator 3 in FIG. 4 has the feature that the charging and discharging time constants of the capacitors C32 and C33 can be determined independently of each other and only when the relay-like operation device 2 is in the off state, the braking signal generator 3 derives therefrom an output. For the sake of brevity, if the hysteresis of the relay-like operation circuit formed with the operational amplifier A31 is neglected, that is, if the resistance value of the resistor R34 is assumed to be zero and if the forward voltage drops of the diodes in the circuit 300 are disregarded, the relation of the time $T_p$, during which the braking signal generator 3 derives therefrom the braking signal, to the time $T_r$ during which the relay-like operation device 2 is in the on state, is given by the following equation (5):

$$T_p = T_d ln[ mkE_{21-S} \{1 - exp(-T_r/T_c)\}] \quad (5)$$

where $T_d = $ (R305 + R301 + R305 R32)C32 (discharging time constant)

$T_c = $ R303C32 (charging time constant)

$m = $ R305 R32/(R305 + R301 + R305 R32)

$n = $ R35/(R35 + R36)

$k = 0$ to 1 (the set position of variable resistor VR31)

the mark represents parallel resistance values.

The components not listed in the above equation have the same values as those of the parts corresponding thereto. Values are selected C33=C32, R302 = R301, R304 = R303, that R306 = R305 and R37 = R36. From the equation (5), the condition for generating the braking signal is given by the following equation (6):

$$mkE_{21-S}\{1 - exp(-T_r/T_c)\} > n(V-V_d) \quad (6)$$

The braking signal generating time $T_p$ of the braking signal generator 3 shown in FIG. 2, given by the equation (3) is given in relation to the time constant $T_{cd}$ which is equal to the charging time constant and the discharging time constant, while the braking signal generating time $T_p$ of the braking signal generator 3 in FIG. 4, given by the equation (5), is given in relation to the charging time constant $T_c$ and the discharging time constant $T_d$. Since the charging and discharging time constants $T_c$ and $T_d$ can be selected independently of each other, it is possible that the length of the braking signal produced by the braking signal generator 3 is independently caused to correspond to the time $T_r$ during which the relay-like operation device 2 is in the on state. This implies that corresponding to the time $T_r$ within which the relay-like operation device 2 is in the on-state the rotating speed of the motor of the power unit 5 burdened with the load 11 rises. Further, corresponding to the time $T_r$ within which the relay-like operation device 2 is in the on-state a charge is stored in the capacitor C32 or C33 of the braking signal generator 3. Consequently, if the charging time constant $T_c$ of the braking signal generator 3 is selected to coincide with the rise of the rotating speed of the motor, the charge stored in the capacitor C32 or C33 has a value corresponding to the rotating speed of the motor. The time $T_r$ is detected but, in practice, the rising rotating speed of the motor is detected. That is, a signal corresponding to the starting characteristic of the motor can be obtained as a charge which is applied to the capacitor C32 or C33. Further, the discharging time constant $T_d$ for discharging the charge stored in the capacitor C32 or C33 when the relay-like operation device 2 has been turned to the off-state is selected so as to provide the braking signal generating time $T_p$ necessary for stopping the rotation of the motor. By determining the time constant $T_d$ corresponding to the braking characteristic of the motor, a braking signal of an optimum length of time can be obtained. Further, since the time $T_p$ is also related to the values of the components effecting the on-off point of the relay-like operation cicuit formed with the operational amplifier A31, for example, the resistance values of the resistors R35 and R36, an appreciably higher degree of freedom is present in obtaining the braking signal having an optimum length of time and the length of time of the braking signal can be easily made optimum.

Since the braking signal generator 3 depicted in FIG. 4 has such features as described above, it is possible to obtain an optimum length of time $T_p$ for the value of the time $T_r$ over a wide range, as compared with the braking signal generator shown in FIg. 2, and motors of various characteristics can be controlled under optimum conditions.

The braking signal generator 3 illustrated in FIG. 4 is adapted such that its braking signal generating time $T_p$ is adjusted with the variable resistor VR31 for dividing the voltage of the input signal fed from the relay-like operation device 2 but, if necessary, it is also possible that the resistors R303 and R304 making up the charging time constant, the resistors R305 and R306 or R32 making up the discharging time constant, the capacitors C32 and C33 making up the charging and discharging time constants or the resistors R35 or R36 and R37 determining the operating point of the relay-like operation circuit can be made adjustable.

The adding amplifier 4 in FIg. 4 is supplied at its input terminal 16 with the output signal $E_{21}$ from the output terminal 50 of the relay-like operation device 2 and at its input terminal 17 with the signal $E_{31}$ from the braking signal generator 3. The resistors R41 and R42 connected to these input terminals are connected to bases of transistors TR43 and TR44 through parallel-connected diodes D47 and D48 of opposite polarities to obtain small dead zone and the transistors TR43 and TR44 have their emitters grounded and hence held at ground potential and their collectors connected to diode bridges DB41 and DB42, respectively. The diode bridges DB41 and DB42 are connected to windings of transformers T41 and T42 respectively as illustrated and output windings of transformers T41 and T42 are connected through diode bridges DB43 and DB44 to filter circuit consisting of resistors R403 and R404 and a capacitor C41 and a filter circuit consisting of resistors R405 and R406 and a capacitor C42, respectively. The input current to the adding amplifier 4 is the current supplied to the two input resistors R41 and R42, that is, the total sum $(I_{41} + I_{42})$ of the current $I_{41}$ flowing due to the signal $E_{21}$ from the relay-like operation device 2 and that $I_{42}$ flowing due to the signal $E_{31}$ from the braking signal generator 3. In the example shown in FIG. 5, the input current has a waveform as depicted in the figure. When the input current $(I_{41} + I_{42})$ is positive, the transistor TR43 is conductive to provide an output voltage between the output terminals 10b and 10c. While, when the input current $(I_{41} + I_{42})$ is negative, the transistor TR44 is conductive to produce an output between the output terminals 10a and 10c. The adding amplifier 4 shown in FIG. 4 is suitable for use in the case where it is necessary to insulate the power source $\pm V$ of the operational amplifier and $E_d$ of the motor from each other and, where such insulation is not required, the adding amplifier depicted in FIG. 2 can be employed.

As will be seen from the above description and the description given previously with regard to FIG. 2, the operation of the example of FIG. 4 becomes as shown in FIG. 5. Where the input voltage $E_t$ is applied in the form of a negative step-like voltage, the relay-like operation device 2 is turned to the on-state and the input current $I_{41}$ resulting from the output $E_{21}$ from the device 2 flows to the adding amplifier 4 to produce a voltage between the output terminals 10b and 10c. By this voltage, the transistors TR502 and TR504 of the power unit 5 are made conductive to rotate the motor, causing an increase in the feedback signal E proportional to its rotational angle and a decrease in the output $E_{11}$ from the amplifier 1. Upon the turning-off of the relay-like operation device 2 at the instant $t = t_2$, the output $E_{31}$ from the braking signal generator 3 is derived as a braking signal therefrom and this braking signal is opposite in polarity to the output derived from the relay-like operation device 2 before it is turned off, and accordingly the input current $I_{42}$ to the adding amplifier 4 becomes a negative current opposite in polarity to that $I_{41}$. Consequently, an output voltage is produced between the output terminals 10a and 10c to turn on the transistors TR501 and TR503 of the power unit 5, to rapidly lower the rotational speed of the motor and the motor is stopped by the braking signal having an appropriate length of time. Where the input signal $E_t$ is large, the time $T_r$ within which the relay-like operation device 2 is in the on-state becomes longer but the time $T_p$ of the braking signal produced by the braking signal generator 3 also becomes prolonged, so that the motor rotating at high speed is properly braked and stopped.

The example of this invention depicted in FIG. 4 features the following points. Only when the relay-like operation device 2 has been turned to the off-state, does the braking signal generator 3 derive therefrom an output signal and this output signal is opposite in polarity to that derived from the relay-like operation device 2 before it is turned off and the output signal thus obtained is used as a braking signal. Since the charging and discharging time constants $T_c$ and $T_d$ of the capacitors C32 and C33 of the braking signal generator 3 can be determined independently of each other, the relation between the rotating speed of the motor with respect to the time $T_r$ within which the relay-like operation device 2 is in the on-state and the braking signal generating time $T_p$ necessary for stopping the motor rotating at that speed can be properly determined and selected as desired. Thus, it is possible to apply proper braking to the motor in response to various input signals $E_t$. Therefore, frequent starting and stopping of the motor can be achieved, so that the ON-OFF control servo apparatus exemplified in FIG. 4 can be very accurate, as compared with that shown in FIG. 2. Further, since proper braking is effected even at lower rotating speeds, as compared with the dynamic braking system and other braking systems the accuracy increases.

Although the example of FIG. 4 has been described in connection with the case where the DC series-wound motor shown in FIG. 2 is used as the power unit 5, it will be evident that any power unit can similarly be employed so long as it has a DC shunt motor or a DC compound motor having forward and backward rotational control circuits.

Further, it will be apparent that the braking signal generator 3 may be a circuit in which the resistor R32 is short-circuited or the resistor R33 is short-circuited and the resistor R34 is removed.

It will be seen that the DC motor control device of this invention is also applicale to reversible operation control of a DC motor with an open loop in which the feedback signal has been removed.

Figure 6:
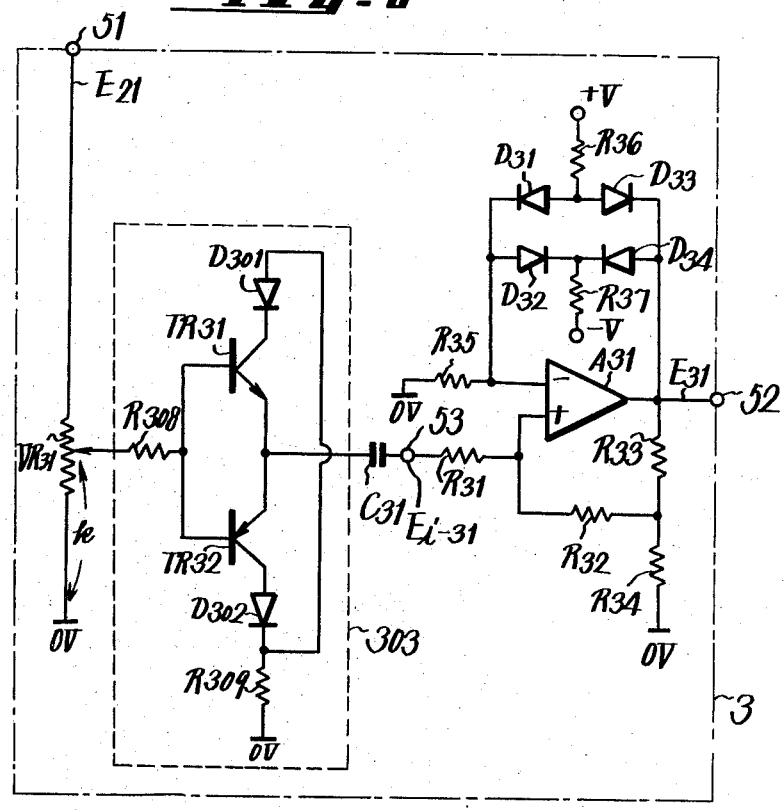
FIG. 6 is a circuit diagram for showing a further embodiment of ON-OFF control device of the invention.

FIG. 6 shows another example of the ON-OFF control device of the invention. In the figure, only the part corresponding to the block 3 in the block diagram of FIG. 1 is depicted and since the remaining parts are the same as those in FIG. 2 or 4, they are not illustrated. In the example of FIG. 6, the braking signal generator 3 further includes a circuit 303 between the movable contact of the variable resistor VR31 and the capacitor C31 and the other circuit construction is substantially the same as that of FIG. 2. The circuit 303 is composed of a resistor R308 connected at its one end to the movable contact of the variable resistor VR31, two transistor TR31 and TR32 have their base electrodes connected together and to the other end of the resistor R308. The emitter electrodes are connected together and to the capacitor C31 and the collector electrodes are connected together through series connected of diodes D301 and D302. The connection point between the diodes D301 and D302 is connected through a resistor R309 to the earth potential 0V.

The circuit 303 of the braking signal generator 3 operates symmetrically with respect to positive and negative input signals, so that its operation will be now described in the case of the positive input signal $E_{21} =$ +E$_{21-S}$, by way of example. When the signal E$_{2i}$ shown in FIG. 3C is applied to the input terminal 51 of the braking signal generator 3 from the relay-like operation device 2, the charging current flows through the variable resistor VR31, the resistor R308, the base-emitter of the transistors TR31, the capacitor C31, and the resistors R31, R32 and R34. Thereafter, when the input signal E$_{21}$ changes from +E$_{21-S}$ to zero, the discharging current flows through the closed circuit of the capacitor C31, the emitter-base of the transistor TR32, the resistor R308, the variable resistor VR31 and the resistors R34, R32 and R31 due to the charge stored in the capacitor C31, which discharging current is the base current of the transistor TR32. Thus, the transistor TR32 is made conductive with the result that the collector current of the transistor TR32 flows through the closed circuit of the capacitor C31, the emitter-collector of the transistor TR32, the diode D302 and the resistors R309, R34, R32 and R31. If the DC current amplification factor of the transistor TR32 is high, the transistor TR32 is made completely conductive and hence the charge stored in the capacitor C31 is substantially discharged through the circuit including the resistor R309. As mentioned above, the charging time constant T$_c$ and the discharging time constant T$_d$ can be determined independently in the example of FIG. 6. The ON-OFF control servo system with the braking signal generator 3 shown in FIG. 6 operates similarly to the case of FIG. 2 which is described in connection with FIGS. 3A to 3C, so that its description will be omitted.

The time interval T$_p$, within which the braking signal generator 3 of the example shown in FIG. 6 generates the braking signal, is expressed by the following equation (7) if the transistors are completely conductive. The voltage drop of the diodes in the circuit 303 in the forward direction is neglected and the resistance values of the resistors R36 and R37 are equal, for the sake of simplicity.

$$T_p = T_d ln[mkE_{21-S}\{1 - exp(-T_r/T_c)\}] \quad (7)$$

where

T$_d$ = (R309 + R31 + R32)C31 (the discharging time constant)

T$_c$ = (R308 + R31 + R32)C31 (the charging time constant)

m = R32/(R309 + R31 + R32)

n = R36/(R35 + R36)

k = 0 to 1 (The set position of the movable constant of the variable resistor VR31)

The condition for generation of the braking signal expressed by the equation (7) is given by the following equation (8).

$$mkE_{21-S}\{1 - exp(-T_r/T_d)\} > n(V - V_d) \quad (8)$$

In the example of FIG. 6, the time interval T$_p$ is adjusted by changing the variable resistor VR31, but it may be also changed by adjusting the resistor R308 which determines the charging time constant, the resistor R309 which determines the discharging time constant, the resistors R31 and R32 and the capacitor C31 which determine the charging and discharging time constants, or any one of the resistors R35 or R36 and R37 which determine the operating point of the relay-like operation circuit, if necessary.

The characteristic of the braking signal generator 3 shown in FIG. 6 is that the charging time constant T$_c$ and the discharging time constant T$_d$ are respectively determined independently as in the example shown in FIG. 4 and the example of FIG. 6 has fewer parts than FIG. 4 and has high reliability.

The characteristic of the ON-OFF control servo system with the braking signal generator shown in FIG. 6 the same as that of the ON-OFF control servo system shown in FIG. 4, and is omitted for the sake of brevity.

It may be apparent that many modifications and variation could be effected without departing from the spirits and scope of the novel concepts of the present invention.

We claim:

1. An ON-OFF control device for a DC electric motor comprising:
a switching means for controlling a DC electric motor;
a first means connected to said switching means and producing on- and off-signals to control said switching means with said on- and off-signals so as to drive said DC electric motor in either direction;
a second means connected to said first means for receiving its output signals and producing on- and off-signals having a polarity which is opposite to that produced by said first means, said on- and off-signals from said second means supplied to said switching means, said second means producing on- and off-signals when said first means is changed from its on-state to off-state, said on- and off-signals from said second means having time durations related to the time interval during which said first means is in the on-state, and said second means controls said switching means so as to apply a braking signal to said DC electric motor,
said second means including a differentiation circuit consisting of a capacitor, and a circuit having on- and off-characteristics,
a circuit connected to said capacitor and in which the charging current path of said capacitor differs from its discharge current path,
said circuit including complementary type transistors and diodes.

2. An ON-OFF control device for a DC electric motor comprising:
a switching means for controlling a DC electric motor;
a first means connected to saids switching means and producing on- and off-signals to control said switching means with said on- and off-signals so as to drive said DC electric motor in either direction;
a second means connected to said first means for receiving its output signals and producing on- and off-signals having a polarity which is opposite to that produced by said first means, said on- and off-signals from said second means supplied to said switching means, said second means producing on- and off-signals when said first means is changed from its on-state to off-state, said on- and off-signals from said second means having time durations related to the time interval during which said first means is in the on-state, and second second means controls said switching means so as to apply a braking signal to said DC electric motor,
said second means including a differentiation circuit consisting of a capcitor, and a circuit having on- and off-characteristics,
a circuit connected to said capacitor and in which the charging current path of said capacitor differs from its discharge current path, said circuit including a diode-resistor network.

3. An ON-OFF control device for a DC electric motor comprising:
a switching means for controlling DC electric motor;
a first means connected to said switching means and producing on- and off-signals to control said switching means with said on- and off-signals so as to drive said DC electric motor in either direction;
a second means connected to said first means for receiving its output signals and producing on- and off-signals having a polarity which is opposite to that produced by said first means, said on- and off-signals from said second means supplied to said switching means, said second means producing on- and off-signals when said first means is changed from its on-state to off-state, said on- and off-signals from said second means having time durations related to the time interval during which said first means is in the on-state, and said second means controls said switching means so as to apply a braking signal to said DC electric motor,
said second means including a differentiation circuit consisting of a capacitor, and a circuit having on- and off-characteristics,
said circuit having on-off characteristics including an operational amplifier, a diode bridge and a power source, said diode bridge being connected between the negative input terminal and the output terminal of said operational amplifier, and an intput signal applied to the positive input terminal of said operational amplifier through said capacitor.

4. An ON-OFF control device for a DC electric motor comprising:
a switching means for controlling a DC electric motor;
a first means connected to said switching means and producing on- and off-signals to control said switching means with said on- and off-signals so as to drive said DC electric motor in either direction; and
a second means connected to said first means for receiving its output signals and producing on- and off-signals having a polarity which is opposite to that produced by said first means, said on- and off-signals from said second means supplied to said switching means, said second means producing on- and off-signals when said first means is changed from its on-state to off-state, said on- and off-signals from said second means having time durations related to the time interval during which said first means is in the on-stage; and said second means controls said switching means so as to apply a braking signal to said DC electric motor.

5. An ON-OFF control device for a DC electric motor as claimed in claim 4 in which said second means includes a differentiation circuit consisting of a capacitor, and a circuit having on- and off-characteristics.

6. An ON-OFF control device for a DC electric motor as claimed in claim 4 in which a circuit is connected to said capacitor and in which the charging current path of said capacitor differs from its discharge current path.

7. An ON-OFF control device for a DC electric motor comprising:
a switching means for controlling a DC electric motor;
a transducer means connected to said DC electric motor and producing an electrical signal corresponding to the rotational angle of said DC electric motor;
a first means connected between said switching means and said transducer means and producing on- and off-signals to control said switching means with said on- and off-signals so as to drive said DC electric motor in either direction;
a second means connected to said first means for receiving its output signals and producing on- and off-signals with a polarity which is opposite to that produced from said first means, said on- and off-signals of said second means connected to said switching means, said second means producing on- and off-signals when said first means is changed from its on-state to off-state, said on- and off-signals from said second means having time durations related to the time interval during which said first means is in the on-stage, whereby said second means controls said switching means so as to apply a braking signal to said DC electric motor.

* * * * *